(12) United States Patent
Kita (10) Patent No.: US 7,444,037 B2
(45) Date of Patent: Oct. 28, 2008

(54) IMAGE PROCESSING APPARATUS, IMAGE PROCESSING METHOD AND PROGRAM

(75) Inventor: Koji Kita, Wakayama-ken (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 741 days.

(21) Appl. No.: 10/943,621

(22) Filed: Sep. 17, 2004

(65) Prior Publication Data
US 2005/0058362 A1 Mar. 17, 2005

(30) Foreign Application Priority Data
Sep. 17, 2003 (JP) .............................. 2003-324515

(51) Int. Cl.
*G06K 9/32* (2006.01)
(52) U.S. Cl. ...................... 382/300; 348/246
(58) Field of Classification Search ................. 382/254, 382/300
See application file for complete search history.

(56) References Cited

U.S. PATENT DOCUMENTS

| | | | |
|---|---|---|---|
| 5,266,805 A | 11/1993 | Edgar | |
| 5,875,040 A * | 2/1999 | Matraszek et al. | 358/453 |
| 7,268,917 B2 * | 9/2007 | Watanabe et al. | 358/1.9 |
| 7,327,877 B2 * | 2/2008 | Kita | 382/167 |
| 2002/0076121 A1 * | 6/2002 | Shimizu et al. | 382/300 |
| 2002/0158977 A1 | 10/2002 | Hamilton, Jr. | |
| 2002/0163674 A1 | 11/2002 | Hamilton, Jr. | |
| 2003/0127597 A1 | 7/2003 | Nakamura et al. | |
| 2004/0071363 A1 * | 4/2004 | Kouri et al. | 382/276 |
| 2005/0047658 A1 * | 3/2005 | Kita | 382/167 |
| 2005/0058362 A1 * | 3/2005 | Kita | 382/254 |

FOREIGN PATENT DOCUMENTS

| | | |
|---|---|---|
| EP | 0 687 106 B | 12/1995 |
| JP | 11-98370 | 4/1999 |
| JP | 2000-341473 | 12/2000 |
| JP | 2000-349968 | 12/2000 |
| JP | 2001-078038 | 3/2001 |

* cited by examiner

*Primary Examiner*—Matthew C Bella
*Assistant Examiner*—Sath V. Perungavoor
(74) *Attorney, Agent, or Firm*—Fulbright & Jaworski LLP (57) ABSTRACT

For correcting a defective portion in image data having a plurality of pixels, a plurality of first target pixels are selected one after another from normal pixels. Any defective pixel is detected within a predetermined area extending about each selected first target pixel as its center and also a normal pixel present on an extension line connecting the first target pixel and the defective pixel is detected and set as a second target pixel. For each defective pixel present between the first target pixel and the second target pixel, an interpolation value is calculated. Further, for each pair of the first target pixel and the second target pixel, a weight coefficient is calculated. The technique stores such plurality of interpolation values and weight coefficients. Then, by using the weight coefficient, a weighted average value of the interpolation values for each defective pixel is calculated and this weighted average value is used for the correction of each defective pixel.

9 Claims, 6 Drawing Sheets

FIG.5 normal pixel
defective pixel

IMAGE PROCESSING APPARATUS, IMAGE PROCESSING METHOD AND PROGRAM

BACKGROUND OF THE INVENTION

1. Field of the Invention

The present invention relates to an image processing apparatus, method, program and a medium storing the program for correcting a defective portion in image data having a plurality of pixels. In particular, the invention relates to an image processing technique for effecting an interpolating operation which allows appropriate correction or "retouching" of the image data even when a boundary (edge) or pattern portion of a photographically recorded image is present within its defective portion, by appropriately reflecting such boundary, pattern or the like in the correction.

2. Description of the Related Art

A photographic film may include a defective portion on its surface, such as a scar, dust, dirt, etc. Then, when a photographically recorded image is read from such "defective" film to be printed on a print sheet or outputted on a display, there is known a technique available for correcting such defect by means of an image processing operation relying on e.g. a luminance adjustment technique and an interpolating technique.

An exemplary technique is known from Japanese Patent Application "Kokai" No.: 11-98370 (at pages 15-16, FIG. 4 thereof in particular). This technique effects correction by way of luminance adjustment, based on the unique property of infrared beam. Namely, unlike the visible beam, the infrared beam, when irradiated on an exposed photographic film, is hardly affected by a photographic image recorded thereon, but affected only by such physical defect as a scar, dust or the like. Referring more particularly to this technique, both infrared beam and visible beam are irradiated on an exposed photographic film. Then, a portion of the film where a pixel value of infrared image data is below a predetermined threshold is determined as a defective portion. Then, to a pixel value of each color component (red (R), green (G), blue (B)) of this defective portion, a correction value is added as a "gain" which corresponds to an amount of luminance attenuation occurring in the defective portion relative to a normal (non-defective) portion of the film, thereby to positively increase the luminance. In this way, the pixel value of each color component of the defective portion is adjusted or corrected relative to the normal portion by means of luminance enhancement.

However, this luminance adjustment technique is based on an assumption that the pixel values of the respective color components of the defective portion have experienced an equal amount of luminance attenuation. For this reason, if the amounts of attenuation in the pixel values of the respective color components differ from each other as may happen in the case of a scar in an emulsion surface on the film, the above technique cannot correct this defect appropriately.

In such case, an interpolation technique may be employed which corrects the defective portion by utilizing pixel values of non-defective pixels adjacent thereto as reference values for the defect correction. However, if the defective portion includes a boundary (edge) or a pattern of the photographic image recorded on the film, such defective portion cannot be properly corrected by the above technique if it simply applies pixel values of adjacent non-defective pixels to the defective portion for its correction. In an attempt to cope with this problem, there has been proposed a further technique known from e.g. Japanese Patent Application "Kokai" No. 2001-78038 (in particular, at pages 7-8, FIGS. 4-5 and FIG. 8), which corrects such defective portion with consideration to the pattern, the edge or the like of the photographic image which may be included therein. According to this technique, the direction of the image boundary or the like is detected first and then pixel values of non-defective pixels which are present along this detected direction of the boundary are applied to the defective portion, whereby the deflective portion may be corrected appropriately with consideration to the image pattern, boundary or the like. More particularly, along a plurality of differing directions from the defective portion, the technique calculates image "attribute" values such as a difference between pixel values of adjacent non-defective pixels, a distance between the adjacent non-defective pixels, etc. Then, for each of the plural directions, based on the data of normal pixels present along a predetermined direction relative to the defective portion on the image, a correction value for correcting the defective portion is obtained by interpolation. Thereafter, based on the calculated image attribute values and the correction values calculated for the respective directions, a final correction value is obtained and used for correcting the defective portion.

Yet, this conventional interpolation-correction technique exemplified by the Japanese Patent Application "Kokai" No. 2001-78038 discussed above still suffers a problem as follows. Namely, in this conventional technique, the calculations of the image attribute values and the interpolation values are effected along a plurality of different radial directions from the defective portion as their common center. Thus, this technique requires a great amount of calculation in total. Further, for the detection of direction of the image boundary or pattern, the technique requires calculations of the image attribute values and interpolation values to be effected radially omni-directionally around the defective portion. Especially, for accurate detection of image boundary or pattern direction, it is needed to decrease or minimize the angular space between adjacent radial directions. Hence, the technique requires a great amount of calculation for the calculations of the image attribute values and interpolation values, thus increasing the load on the calculating section such as a CPU. Accordingly, it is difficult for this technique to increase its processing speed.

SUMMARY OF THE INVENTION

In view of the above-described state of the art, a primary object of the present invention is to provide an image processing technique capable of effecting accurate correction of a defective portion by detecting the direction where the defective portion is present and effecting an appropriate interpolation operation along that detected direction and which is capable also of increasing the processing speed with restricting the amount of calculation needed for the correction.

For accomplishing the above-noted object, according to one aspect of the present invention, there is proposed an image processing apparatus for correcting a defective portion in image data having a plurality of pixels, the apparatus comprising:

a first target pixel selecting section for selecting a plurality of first target pixels one after another from normal pixels;

a second target pixel detecting section for detecting, for each first target pixel selected by said first target pixel selecting section, a defective pixel present within a predetermined area extending around said first target pixel as its center and then detecting a normal pixel present on an extension line connecting said first target pixel to said defective pixel and setting this detected normal pixel as a second target pixel;

an interpolation value calculating section for calculating for one or more defective pixels present between said first target pixel and said second target pixel, an interpolation value for each said defective pixel based on a pixel value of said first target pixel and a pixel value of said second target pixel;

a weight coefficient calculating section for calculating a weight coefficient for each pair of said first target pixel and said second target pixel, based on the pixel value of the first target pixel and the pixel value of the second target pixel;

a memory for storing a plurality of interpolation values calculated for each defective pixel by said interpolation value calculating section and the weight coefficient calculated for each pair of the first target pixel and the second target pixel by said weight coefficient calculating section as said first target pixel selecting section selects the plurality of first target pixels;

a weighted average value calculating section for calculating a weighted average value of the interpolation values of each defective pixel by using the plurality of interpolation values stored in said memory for each defective pixel and the weight coefficient also stored in said memory for each pair of the first target pixel and the second target pixel; and a correcting section for correcting each defective pixel by using said weighted average value calculated by said weighted average value calculating section.

Incidentally, at the interpolation value calculating section or the weight coefficient calculating section, in order to increase the reliability of its calculation result of interpolation value or weight coefficient, as the pixel value of the first target pixel or the second pixel value, the section can use an average value obtained by adding, to this pixel value of the first target pixel or the second target pixel, a pixel value(s) of one or more normal pixels present around the first or second target pixel.

With the above-described construction, for each defective pixel, it is possible to obtain interpolation values based on pixel values of normal pixels present along a plurality of directions. Further, a weight coefficient for each direction is obtained in each direction, based on the pixel values of the normal pixels present in each direction around the defective pixel and a weighted average value of these weight coefficients is calculated and used for the final correction. Therefore, it is possible to obtain a final correction value reflecting an image boundary, pattern or the like present in each direction around the defective pixel. Consequently, it is possible to effect an appropriate interpolation operation with reflecting such image boundary, pattern or the like present in each direction around the defective pixel. Further, all of the interpolation values for one or two defective pixels present between the first target pixel and the second target pixel can be obtained by one time of calculation. As a result, it is possible to restrict the number of operations required for correction of all defective pixels included in image data. Hence, the amount of calculation may be reduced and the processing speed may be increased.

According to one preferred embodiment of the present invention, in said weight coefficient calculating section, either the pixel value of the first target pixel and the pixel value of the second target pixel whichever the greater is used as a denominator and whichever the smaller is used a numerator and a ratio thereof is raised to the nth power (n is a desired natural number) and this is calculated said weight coefficient. According to a further preferred embodiment of the present invention, in said weight coefficient calculating section, an absolute value of a difference between the pixel value of the first target pixel and the pixel value of the second target pixel is obtained, a complement of this absolute value relative to a predetermined value is obtained and this complement is then raised to the nth power (n is a desired natural number) and this result is calculated as said weight coefficient. According to these features, the weight coefficient can provide the greater weight for a pair of first target pixel and the second target pixel present across the defective value, whose respective values are the nearer each other. With such "enhancement" of the weight coefficient, it is possible to increase the effect of the interpolation value of the defective pixel calculated in the direction where the image boundary, edge or the like is present, to be exerted on the final correction value. As a result, the interpolation correction of the defective pixel can be carried out appropriately with reflecting presence of such image boundary, edge, pattern or the like. In this respect, the appropriate value of "n" will differ, depending on the condition of the image to be corrected. Therefore, preferably, this value should be experimentally obtained based on statistic data of various image data.

According to a still further preferred embodiment of the present invention, said interpolation value calculating section calculates the interpolation value for each defective pixel present between the first target pixel and the second target pixel by means of a linear interpolation of the pixel value of the first target pixel and the pixel value of the second target pixel. That is to say, the interpolation value for each defective pixel present between the first target pixel and the second target pixel can be calculated, based on the pixel values of the first and second target pixels present on the opposite sides thereof and distances relative respectively to the first target pixel and the second target pixel. In this way, appropriate interpolation values for all defective pixels can be calculated and obtained at one time. Therefore, it is possible to obtain appropriate interpolation values while restricting the number of calculates and increasing the processing speed.

For accomplishing the above-noted object, according to a further aspect of the present invention, there is proposed an image processing method for correcting a defective portion in image data having a plurality of pixels, the method comprising the steps of:

selecting a plurality of first target pixels one after another from normal pixels;

detecting portion for detecting, for each first target pixel selected, a defective pixel present within a predetermined area extending around said first target pixel as its center and then detecting a normal pixel present on an extension line connecting said first target pixel to said defective pixel and setting this detected normal pixel as a second target pixel;

calculating for one or more defective pixels present between said first target pixel and said second target pixel, an interpolation value for each said defective pixel based on a pixel value of said first target pixel and a pixel value of said second target pixel;

calculating a weight coefficient for each pair of said first target pixel and said second target pixel, based on the pixel value of the first target pixel and the pixel value of the second target pixel;

storing a plurality of interpolation values calculated for each defective pixel and the weight coefficient calculated for each pair of the first target pixel and the second target pixel as the plurality of first target pixels are selected one after another;

calculating a weighted average value of the interpolation values of each defective pixel by using the plurality of interpolation values stored for each defective pixel and the weight coefficient also stored for each pair of the first target pixel and the second target pixel; and correcting each defective pixel by using said weighted average value calculated.

With this method, the above-described function/effect of the image processing apparatus can be achieved. Hence, it is possible to effect an appropriate interpolation operation with reflecting such image boundary, pattern or the like present in each direction around the defective pixel. Further, the amount of calculation may be reduced and the processing speed may be increased.

Further and other features and advantages of the invention will become apparent upon reading following detailed description of preferred embodiments thereof with reference to the accompanying drawings.

DESCRIPTION OF THE PREFERRED EMBODIMENTS

Figure 1:
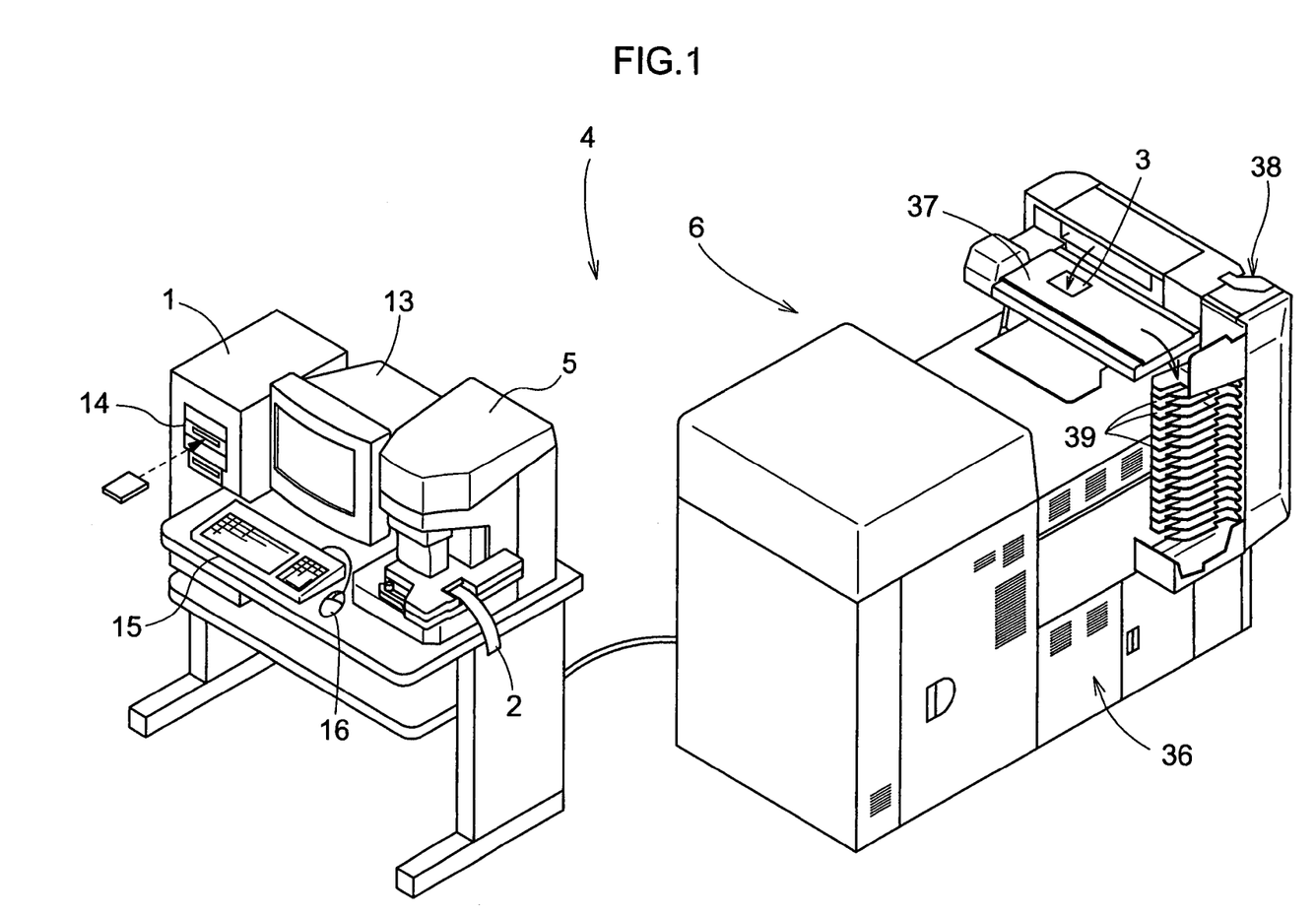
FIG. 1 is a perspective view showing an appearance of an image printing system using an image processing technique relating to the invention.
Figure 2:
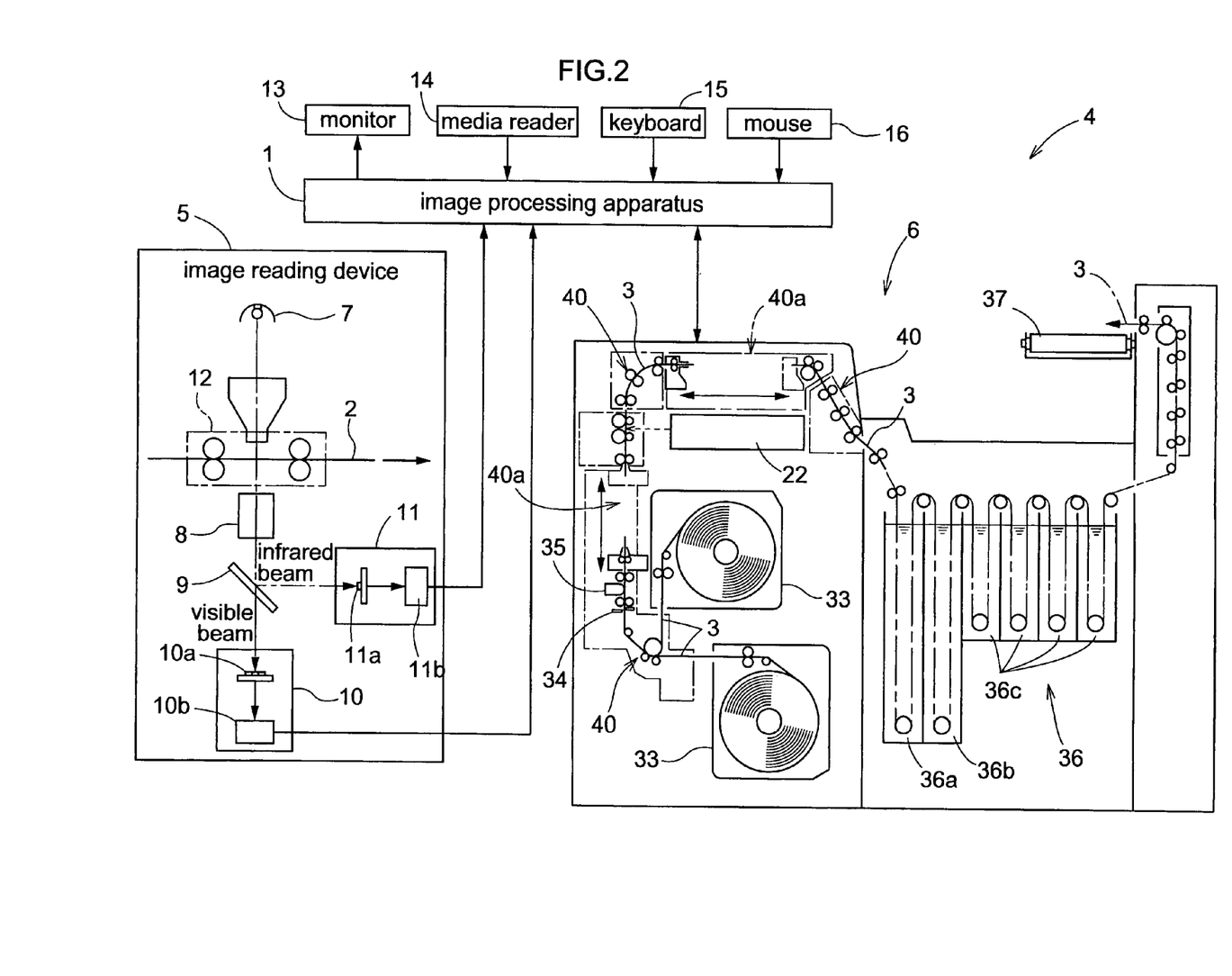
FIG. 2 is a diagram showing a schematic construction of the image printing system using the image processing technique relating to the invention.
Figure 3:
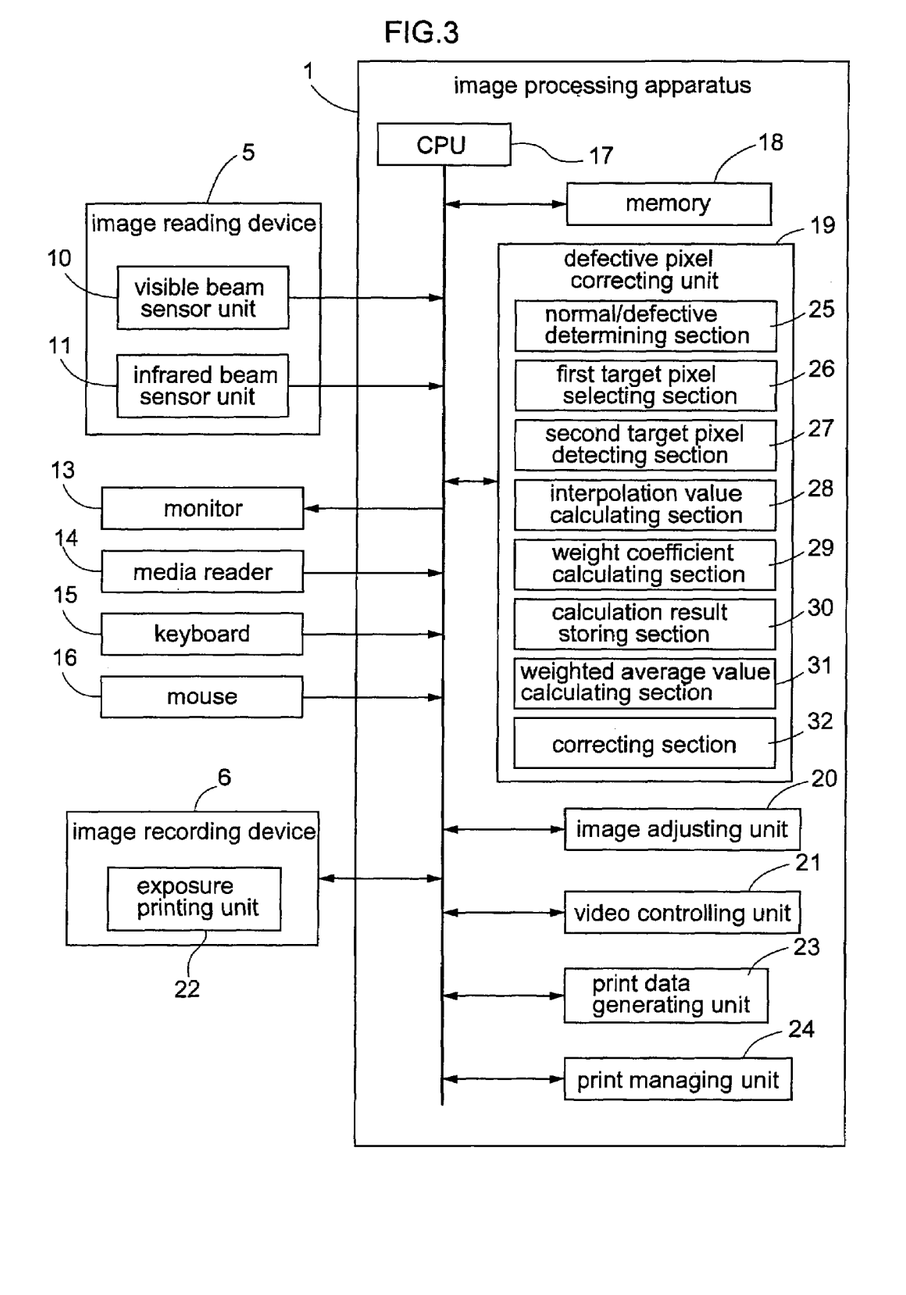
FIG. 3 is a block diagram showing various functional units of an image processing apparatus using the image processing technique relating to the invention.

FIG. 1 is a perspective view showing an appearance of an image printing system 4. This image printing system 4 is adapted for reading an image from a photographic film 2 and then recording this read film image on a print paper 3 and includes an image processing apparatus relating to the present invention. FIG. 2 is a diagram showing a schematic construction of the image printing system 4. FIG. 3 is a block diagram showing the various functional units of the image processing apparatus 1.

As shown in these figures, this image printing system 4 includes an image reading device 5 for reading a photographically recorded image in each frame of the photographic film 2 developed by an unillustrated film developing device as digital image data, the image processing apparatus 1 configured for generating print data by effecting an image processing operation on the acquired image data, and an image recording device 6 configured for recording an image on the print paper 3 based on the print data from the image processing apparatus 1 by effecting an exposing operation and a developing operation.

The image reading device 5 is a so-called film scanner. As shown in FIG. 2, this device 5 or scanner includes, as principal components thereof, an illuminating optical unit 7, an imaging photographic unit 8 comprising e.g. a zooming lens, a dichroic mirror 9 for separating an incident beam into a visible beam and an infrared beam, a visible beam sensor unit 10, and an infrared beam sensor unit 11. The illuminating optical unit 7 includes a halogen lamp or a light-emitting diode as a light source, a mirror tunnel for modulating the light or beam from the light source, and a diffuser plate, etc. The visible beam sensor unit 10 includes three CCD arrays 10a having color filters adapted for detection of respective color components R (red), G (green) and B (blue) together constituting the visible beam image, and a visible beam signal processing circuit 10b adapted for processing respective visible beam signals acquired by these CCD arrays 10a to produce image data relating respectively to the R beam component, G beam component and B beam component and then sending these data to the image processing apparatus 1. Further, in order to detect a scar or any physical damage which may be present in the photographic film 2 as an infrared image, the infrared beam sensor unit 11 includes a CCD array 11a arranged for receiving only the infrared beam separated by the dichroic mirror 9 and an infrared signal processing circuit 11b for processing infrared signals acquired by the CCD array 11a to produce infrared image data and then sending this data to the image processing apparatus 1.

With the image reading device 5 having the above-described construction, when a photographic image recorded frame of the photographic film 2 is fixed in position at a predetermined reading position, the reading operation of this photographic image is initiated. In this, a projection image of the photographic image of the frame is read in the form of a plurality of discreet slit images by the visible beam sensor unit 10 first and then by the infrared beam sensor unit 11, through which the image is subjected to photoelectric conversions into image signals of the respective R, G, B color components and image signals of infrared components, respectively. Then, these signals are all transmitted as the digital image data to the image processing apparatus 1. The control operations by the illuminating optical unit 7, the imaging optical unit 8, the visible beam sensor unit 10 and the infrared beam sensor unit 11 to realize the above-described operations thereof are effected by the image processing apparatus 1. Hence, in the instant embodiment, a functional portion of the image processing unit 1 constitutes a constructional element of the image reading device 5.

In this embodiment, the image processing apparatus 1 comprises basically a general-purpose computer, which includes, as "peripherals" thereof, such components as a monitor 13 for displaying an operation screen of this image printing system 4, a media reader 14 for reading an image from e.g. a memory card of a digital camera, a keyboard 15 and a mouse 16 employed for allowing operator's input operations.

The image processing apparatus 1 has a CPU 17 as a principal component thereof, which includes various functional units for effecting various operations on inputted data, realized in the form of hardware and/or software. Referring those functional units particularly pertinent to the present invention, as shown in FIG. 3, a memory 18 is provided for temporarily storing the visible image data and the infrared image data for subsequent various operations thereof. A defective pixel correcting unit 19 is provided for effecting correction of a defective pixel by using the visible image data and the infrared image data stored in the memory 18. An image adjusting unit 20 is provided for effecting various image processing operations, other than the defective pixel correction, on the visible image data mapped in the memory 18, including a color tone correction, a filtering (shading, sharpness adjustment or the like), a trimming, etc. Further, a video controlling unit 21 is provided for inputting the image data and other display items into a video memory and also converting the image mapped in the video memory into video signals by means of a video controller and then sending these video signals to the display 13. A print data generating unit 23 is provided for converting the respective final image data processed respectively by the defective pixel correcting unit 19 and the image adjusting unit 20 into the print data and then transmitting these data to an exposure printing unit 22 of the image recording device 6. A print managing unit 24 is provided for controlling the various functional units in accordance with operational instructions inputted by the operator via the keyboard 15 and the mouse 16, etc. under the operation screen created by using a graphical user interface (GUI) or operational instructions programmed in advance.

The defect pixel correcting unit 19 includes a normal/ defective determining section 25 for determining whether each pixel included in the visible image data is a normal pixel or a defective pixel, based on the infrared image data stored at the memory 18 and then creating a normal/deflective map (coordinates system) in which normal pixels and defective pixels are stored or registered in association with their coordinates, a first target pixel selecting section 26 for selecting a plurality of first target pixels P one after another from those pixels determined as normal pixels by the normal/defective determining section 25, a second target pixel detecting section 27 for detecting, for each first target pixel P selected by the first target pixel selecting section 26, any defective pixel present within a predetermined area E extending about said first target pixel as its center and then detecting a normal pixel present on an extension line connecting said first target pixel to said defective pixel and setting this detected normal pixel as a second target pixel Q, an interpolation value calculating section 28 for calculating for one or more defective pixels present between said first target pixel P and said second target pixel Q, an interpolation value H for each said defective pixel based on a pixel value of said first target pixel P and a pixel value of said second target pixel Q, a weight coefficient calculating section 29 for calculating a weight coefficient H for each pair of said first target pixel and said second target pixel, based on the pixel value of the first target pixel P and the pixel value of the second target pixel Q, a calculation result storing section 30 for storing a plurality of interpolation values H calculated for each defective pixel by said interpolation value calculating section 28 and the weight coefficient W calculated for each pair of the first target pixel P and the second target pixel Q by said weight coefficient calculating section 29 as said first target pixel selecting section 26 selects the plurality of first target pixels, a weighted average value calculating section 31 for calculating a weighted average value A of the interpolation values H of each defective pixel by using the plurality of interpolation values H stored for each defective pixel and the weight coefficient W also stored for each pair of the first target pixel and the second target pixel, and a correcting section 32 for correcting each defective pixel by using said weighted average value A calculated by said weighted average value calculating section 31. Incidentally, the marks "P", "Q", "E", "H", "W", "A" generically represent the first target pixel, the second target pixel, the predetermined area, the interpolation value, the weight coefficient, and the weighted average value, which may be present in plurality. In the following discussion, marks with numerical or alphabetical subscripts, such as "P○", "Q○○" will be used to represent a particular one of a plurality of them.

In the image recording device 6, as shown in FIG. 2, a print paper in the form of roll stored in each of two print paper magazines 33 is drawn out and then cut by a sheet cutter 34 into a print size. On a back face of this cut print paper 3, a back printing unit 35 prints various print processing information including color correction information, a serial frame number, etc. Further, the exposure printing unit 22 effects an exposure of the front face of the print paper 3 with a photographic image. Then, this exposed print paper 3 is introduced for its development to a developing tank unit 36 having a plurality of developing liquid tanks. After being dried, the print paper 3 is sent from a transverse conveyer 37 disposed at an upper portion of the recording device to a sorter 38, in which a plurality of print papers 3 are stacked on a plurality of trays 39 of this sorter 38 as being sorted out in the storage unit of customer's order (see FIG. 1).

Further, for use with this image recording device 6, there is provided a print paper transporting mechanism 40 for transporting the print paper 3 at a transporting speed suitable for each processing. The print paper transporting mechanism 40 consists essentially of a plurality of pairs of pinched-transport rollers including chucker type print paper transport units 40a disposed forwardly and rearwardly of the exposure printing unit 22 relative to the transporting direction of the print paper. The exposure printing unit 22 includes line exposure heads for effecting irradiation of laser beams of three R, G, B primary colors along a main scanning direction on the print paper 3 being transported in a sub scanning direction, based on the print data transmitted from the image recording device 6. The developing tank unit 36 includes a color development tank 36a reserving therein a color developing liquid, a bleaching-fixing tank 36b reserving therein a bleaching-fixing liquid and a stabilizing tank 36c reserving therein a stabilizing liquid.

Figure 4:
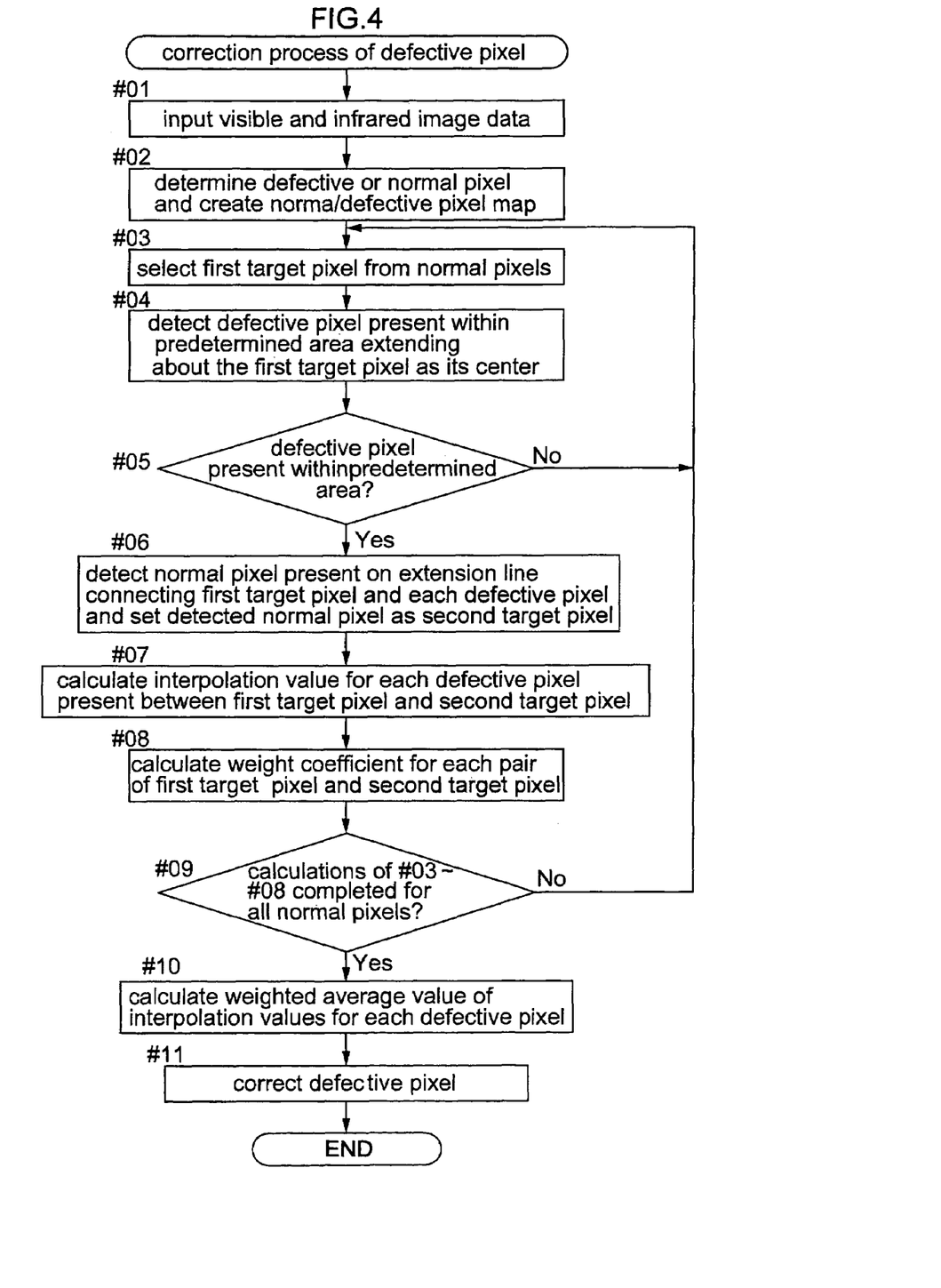
FIG. 4 is a flowchart of a correction operation of a defective pixel according to the invention.

Next, the correction operation of a defective pixel relating to this embodiment will be described in details with reference to the flowchart shown in FIG. 4.

First, the visible image data and the infrared image data acquired respectively by the visible sensor unit 10 and the infrared sensor unit 11 of the image reading device 5 are inputted to and stored at the memory 18 (step #01). Then, by using the infrared image data stored at the memory 18 at step #01, the normal/defective determining section 25 determines whether each pixel included in the visible image data is a normal pixel or a defective pixel, thereby to create a normal/ defective map recording respective coordinates of the normal pixels and the defective pixels therein (step #02). Specifically, in this process, if a pixel included in the infrared image data has a pixel value is greater than a predetermined threshold value, this pixel is determined as a normal pixel. Whereas if the pixel has a pixel value below the threshold value, then, this pixel is determined as a defective pixel. Then, information indicative of being normal/defective is recorded (or registered) in the normal/defective map in correspondence with the coordinates of each pixel. The predetermined threshold value employed in this process can advantageously be a value obtained based on an average value of pixel values of all pixels included in the infrared image data.

Next, the first target pixel selecting section 26 selects a first target pixel P from those pixels determined as normal pixels by the normal/defective determining section 24 (step #03). This first target pixel P is one of the pixels registered as normal pixel in the normal/defective map and which pixel is not yet selected as the first target pixel P. In this, from the normal pixels, any single pixel can be selected as the first target pixel, as long as it is not yet selected as a first target pixel P. However, since all of the normal pixels included in the visible image data will be selected eventually as the first target pixels P, advantageously, this selection of the first target pixel P is effected by shifting from any corner of the image data from one pixel to the next.

Figure 5:
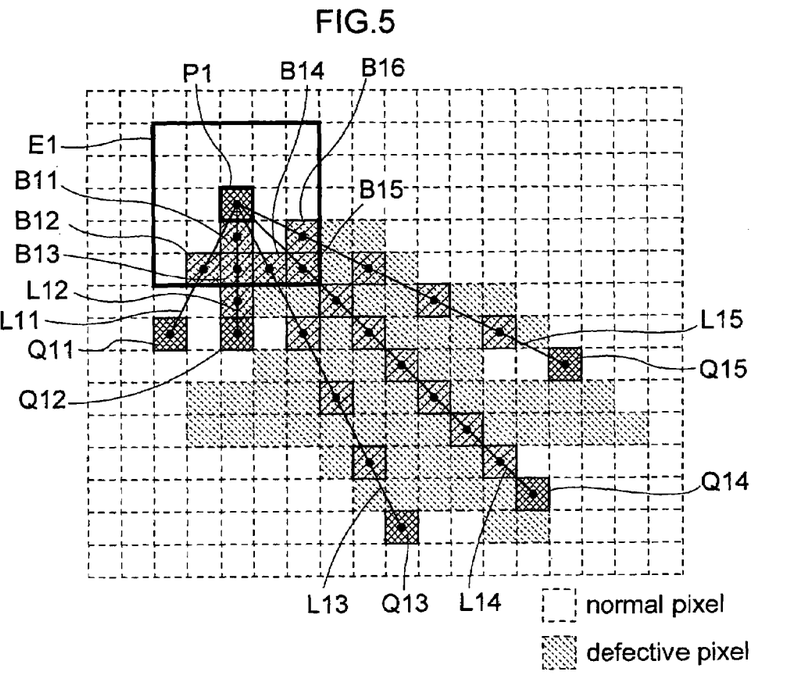
FIG. 5 is an explanatory view illustrating an example of operations at steps #03 through #08 on a first target pixel in the correction operation of a defective pixel according to the invention.

Next, the second target pixel detecting section 27 detects a defective pixel if any within a predetermined area E about the first target pixel P selected by the first target pixel selecting section 26 as its center (step #04) and determines whether any defective pixel is present within the predetermined area E (step #05). If it is determined that no defective pixel is present within the predetermined area E (step 05: NO), then, calculation for this particular first target pixel P is terminated. And, the process returns to step #03 to select a next normal pixel as a first target pixel P. On the other hand, if it is determined that a defective pixel is present within the predetermined area E (step #05: YES), then, the process goes to step #06 to be detailed later. FIG. 5 is an explanatory view of the process from step #03 through step #08 on one first target pixel P1. In the following discussion on this process from step #03 through step 08, each pixel is denoted with a mark shown in this FIG. 5. As shown in this figure, in the instant embodiment, the predetermined area E1 is a square area consisting of 5×5 pixels.

In general, depending on the size of this predetermined area E, the spatial range for detecting any deflective pixels about the first target pixel is determined. The greater the predetermined area E, the greater the number of defective pixels will be included therein. Therefore, as this predetermined area E is enlarged, the number of directions for the second target pixel Q detection from the first target pixel P as the common center is increased, which means increase in the number of directions along which interpolation values H are calculated for the defective pixel by the interpolation value calculating section 28 and increase in the number of interpolation values H to be calculated for each defective pixel This eventually results in increase in the reliability of a weighted average value A of the interpolation values of each defective pixel calculated by a process of step #10 described later. On the other hand, the greater the predetermined area E, the greater the amount of calculation to be made, hence, the lower the processing speed. For these reasons, the size of the predetermined area E will be determined, taking these respects into consideration. Incidentally, in case the predetermined area E is a square area consisting of 5×5 pixels like this case, total of 8 (eight) interpolation values are calculated for each defective pixel. In case the area E is a square area consisting of 3×3 pixels like this case, total of 4 (four) interpolation values will be calculated for each defective pixel. In case the area E is a square area consisting of 7×7 pixels like this case, total of 12 (twelve) interpolation values will be calculated for each defective pixel. The shape of the predetermined area E is not particularly limited and this area can be any desired shape. Now, in the example shown in FIG. 5, total of 6 (six) defective pixels B11-B16 are present within the predetermined area E1.

For each of these defective pixels B11-B16, the second target pixel detecting section 27 detects a normal pixel present on an extension line L11-L15 connecting between the first target pixel P1 and each defective pixel B11-B16 and extending beyond the latter and determines such detected normal pixel as a second target pixel Q11-Q15 (step #06). Specifically, a normal pixel present on an extension line L11 connecting between the first target pixel P1 and the defective pixel B12 is set as a second target pixel Q11. Further, a normal pixel present on an extension line L12 connecting between the first target pixel P1 and the defective pixel B11 is set as a second target pixel Q12. In this, since the further defective pixel B13 is present on this same extension line L12 extending from the first target pixel P1 to the defective pixel B11, there is no need of detecting a normal pixel which may be present on the extension line extending from the first target pixel P1 to the defective pixel B13. Similarly, for the other extension lines L13-L15 extending from the first target pixel P1 to the defective pixels B14-B16, respectively, normal pixels which may be present on these extension lines L13-L15 will be detected and set as second target pixels Q13-Q15, respectively.

Figure 6:
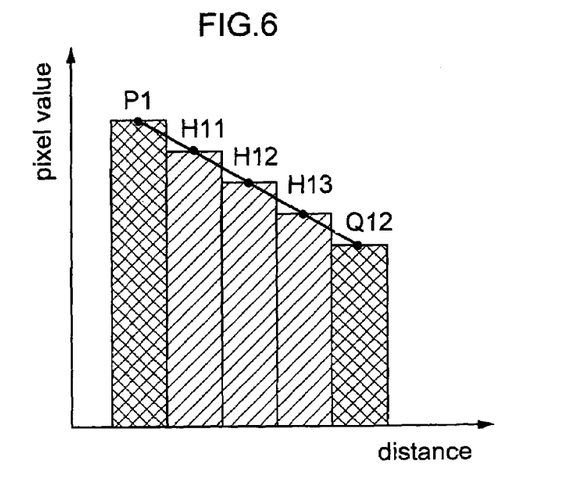
FIG. 6 is a graph illustrating an example of a calculation method of an interpolation value of a defective pixel present between a first target pixel and a second target pixel in the correction operation of a defective pixel according to the invention.

Next, for one or more defective pixels present between the first target pixel P1 and the respective second target pixels Q11-Q15, the interpolation value calculating section 28 calculates interpolation values H for each defective pixel, based on the pixel value of the first target pixel P1 and the respective pixel values of the second target pixels Q11-Q15 (step #07). As a method of this calculation of interpolation values for the defective pixel, there is employed a method for deducing and obtaining a pixel value which the defective pixel would have if it were not for its defect. For this purpose, a linear interpolation technique can be employed. Specifically, for instance, in the calculations of the interpolation values H11-H13 of the three defective pixels present between the first target pixel P1 and the second target pixel Q12, as shown in the graph of FIG. 6, a straight line will be drawn between the pixel value of the first target pixel P1 and the second target pixel Q12, then, an intermediate value on this straight line corresponding to a ratio between a distance from the first target pixel P1 to each defective pixel and a distance from that defective pixel to the second target pixel Q12 will be set as the interpolation values H11-H13 of the respective defective pixels. Incidentally, the calculation method of the interpolation value of the defective pixel is not limited to this linear interpolation technique. Any other type of interpolation method can be employed which can deduce and obtain a pixel value of each defective pixel present between the first target pixel P1 and the second target pixel Q11-Q15, were it not for the defect in that pixel. Then, the interpolation value H of each defective pixel calculated by this step #07 is stored at the calculation result storing section 30 in association with the coordinates of each defective pixel.

Next, based on the pixel value of the first target pixel P1 and the pixel values of the second target pixels Q11-Q15, the weight coefficient calculating section 29 calculates weight coefficients W1-W15 for each pair of the first target pixel P1 and each one of the second target pixels Q11-Q15, that is, the pair of P1-Q11, the pair of P1-Q12, the pair of P1-Q13, the pair of P1-Q14 and the pair of P1-Q15 (step #08). This weight coefficient W11-W15 is a coefficient for determining to what degree the interpolation value H of each defective pixel calculated by step #07 is to be used (or reflected) in a final correction value (a weighted average value A to be described later) relative to interpolation values H of this defective pixel for the other first target pixels P, as will be detailed later. Namely, this coefficient is used for determining the reliability (degree of appropriateness) of the interpolation value H of each defective pixel for each pair of the first target pixel P1 and each of the second target pixels Q11-Q15.

In general, in case the pixel value of the first target pixel P is distant from the pixel value of the second target pixel, there is high possibility of a border, an edge, a pattern of an image being present between the first target pixel P and the second target pixel Q. Conversely, if the pixel value of the first target pixel P is near the pixel value of the second target pixel Q, the opposite is true. Namely, the possibility is higher of no such boundary, edge or the like being present between the first target pixel P and the second target pixel Q. In such case, it is believed that an interpolation value H of the defective pixel interpolated in a direction along an image boundary, edge or the like is more "appropriate" than an interpolation value H of this defective pixel interpolated along a direction intersecting such image boundary, edge or the like. This is because appropriate assumption (deduction) of a pixel value of a defective value by the linear interpolation technique or the like is difficult if this defective pixel is present between normal pixels in a direction along which the pixel value varies greatly, whereas an appropriate interpolation value of a defective pixel can be relatively easily deduced in the case of interpolation in a direction along the pixel value does not greatly vary.

Then, in the instant embodiment, either the pixel value of the first target pixel P1 and the pixel value of the second target pixel Q11-Q15, whichever the greater is used as a denominator and whichever the smaller is used a numerator. And, a ratio thereof is raised to the nth power (n is a desired natural number) and this is used as the weight coefficient W11-W15. With this, the weight coefficients W11-W15 will be respectively calculated as a coefficient providing a greater weight for a pair whose pixel value of the first target pixel P1 is nearer to the pixel value of the second target pixel Q11-Q15.

Specifically, these weight coefficients W11-W15 are calculated according to the following formulae (1) to (5) below $$W11 = \{\min(P1, Q11)/\max(P1, Q11)\}^n \quad (1)$$

$$W12 = \{\min(P1, Q12)/\max(P1, Q12)\}^n \quad (2)$$

$$W13 = \{\min(P1, Q13)/\max(P1, Q13)\}^n \quad (3)$$

$$W14 = \{\min(P1, Q14)/\max(P1, Q14)\}^n \quad (4)$$

$$W15 = \{\min(P1, Q15)/\max(P1, Q15)\}^n \quad (5)$$

($\hat{}$ denotes the exponential power).

where, "min" is a minimum value calculating function, and "max" is a maximum value calculating function. Therefore taking the formula (1) for example, "min (P1, Q11)" is the smaller one of either the pixel value of P1 and the pixel value of Q11. "max (P1, Q11)" is the greater one of either the pixel value of P1 and the pixel value of Q11. Then, by effecting the calculation: min (P1, Q11)/max (P1, Q11), the weight coefficient W11 can be calculated which provides the greater weight, the nearer the value of the first target pixel P1 and the pixel value of the second target value Q11. Further, the calculation: min (P1, Q11)/max (P1, Q11) will result in a value greater than "0" and smaller than "1" and n is a natural number. Therefore, by raising this to the nth power, the value of the weight coefficient W11 decreases. In this, if the value resulting from the calculation: min (P1, Q11)/max (P1, Q11) is large near "1", this value does not decrease significantly when it is raised to the nth power. On the other hand, if this value is small near "0", the value decreases significantly when it is raised to the nth power. In this way, the value of the weight coefficient W11 can be further "enhanced".

With such "enhancement" of the weight coefficients W11-W15 by raising each to the nth power, it is possible to increase the effect of the interpolation value of the defective pixel calculated in the direction where the image boundary, edge or the like is present, to be exerted on the final correction value. As a result, the interpolation correction of the defective pixel can be carried out appropriately with reflecting presence of such image boundary, edge, pattern or the like. In this respect, the appropriate value of "n" will differ, depending on the condition of the image to be corrected. Therefore, ideally, this value should be experimentally obtained based on statistic data of various image data. In general, however, if this value of "n" is too small, this will result in blurring of the boundary, edge of the like in the final corrected image. Conversely, if this value of "n" is too large, this will result in excessive sharpness of the boundary, edge or the like. Therefore, in practice, in the case of a standard photography, the appropriate value of "n" ranges from 15 to 30 approximately. Further, for appropriate correction of a boundary between a flesh color and black, the appropriate value of "n" will often be about 20.

The calculation method of the weight coefficients W11-W15 is not limited to the above-described method. Any other method can be used as long as it allows calculation of the weight coefficient W11-W15 indicating the reliability regarding to what degree the interpolation value H of each defective pixel is "appropriate", based on the relationship between the pixel value of the first target pixel P1 and the pixel value of the respective second target pixels Q11-Q15. For instance, according to a further method, the method first obtains an absolute value of a difference between a pixel value of the first target pixel P1 and the pixel value of each second target pixel Q11-Q15, then obtains a complement of this absolute value relative to a predetermined value α and divides this complement b by the predetermined value α. Finally, the method raises the resultant quotient to the nth power (n is a desired natural number) and uses this result as the weight coefficient W11-W15.

Specifically, in this case, the weight coefficients W11-W15 are calculated according to the following formulae (6) to (10).

$$W11 = \{(\alpha - |P1 - Q11|)/\alpha\}^n \quad (6)$$

$$W12 = \{(\alpha - |P1 - Q12|)/\alpha\}^n \quad (7)$$

$$W11 = \{(\alpha - |P1 - Q13|)/\alpha\}^n \quad (8)$$

$$W11 = \{(\alpha - |P1 - Q14|)/\alpha\}^n \quad (9)$$

$$W11 = \{(\alpha - |P1 - Q15|)/\alpha\}^n \quad (10)$$

($\hat{}$ denotes the exponential power).

where, preferably the predetermined value α is a maximum value of the absolute value of the difference between the pixel value of the first target pixel P1 and the pixel value of the second pixel value Q11-Q15. With this, the weight coefficient W11-W15 can provide the greater weight for a pair of first target pixel P1 and the second target pixel Q11-Q15 whose respective values are the nearer each other. Incidentally, the value of the predetermined value α is not limited to the above. Alternatively, this can be a value below the maximum value of the absolute value of the difference between the pixel value of the first target pixel P1 and the pixel value of the second pixel value Q11-Q15. In this case, however, the complement can have a negative value. Therefore, a certain condition will be needed for rendering the weight coefficient W11-W15 to "0" if the complement is smaller than "0". Further, in this case, in accordance with the above-described method of calculation of weight coefficients W11-W15, in order for the weight coefficients W11-W15 to be a value greater than "0" and smaller than "1", the complement is divided by the predetermined value α. Instead, without such division of the complement by the predetermined value α, the nth power of the complement can be directly used as the weight coefficient W11-W15. In the case of such alternative calculation method of weight coefficient W11-W15, also, its is preferred that the value of "n" should be experimentally obtained based on statistic data of various image data, as described hereinbefore.

The weight coefficients W11-W15 calculated in the manners described above at step #08 for the respective pairs of the first target pixel P1 and the second target pixels Q11-Q15 are stored at the calculation result storing section 30 in association with the respective pairs.

Next, the process determines whether the calculations of steps #03 through #08 have been completed for all of the normal pixels registered in the normal/defective map or not (step #09). This determination can be made by determining whether the operations of steps #03 through #08 have been completed or not for all of the normal pixels registered as normal pixels in the formal/defective map as the "first target pixels P". In this, even when a certain normal pixel has not yet been selected as a first target pixel P, this same normal pixel may have been selected already as a second target pixel Q relative to another normal pixel selected as the first target pixel P. In such case, this normal pixel has been already used in the calculations of the interpolation value H and the weight coefficient W with that further normal pixel. In this case, in the calculations of steps #07 and #08 when that normal pixel is selected as the first target pixel P, it is preferred that the calculations of the interpolation value H and the weight coefficient W relative to any other normal pixel (second target pixel Q) on which these calculations have already been completed should be omitted. In this way, it is possible to avoid overlapping of calculations of interpolation value H and the weight coefficient W for the defective pixel at steps #07 and #08. As a result, the amount of calculation can be restricted advantageously.

Figure 7:
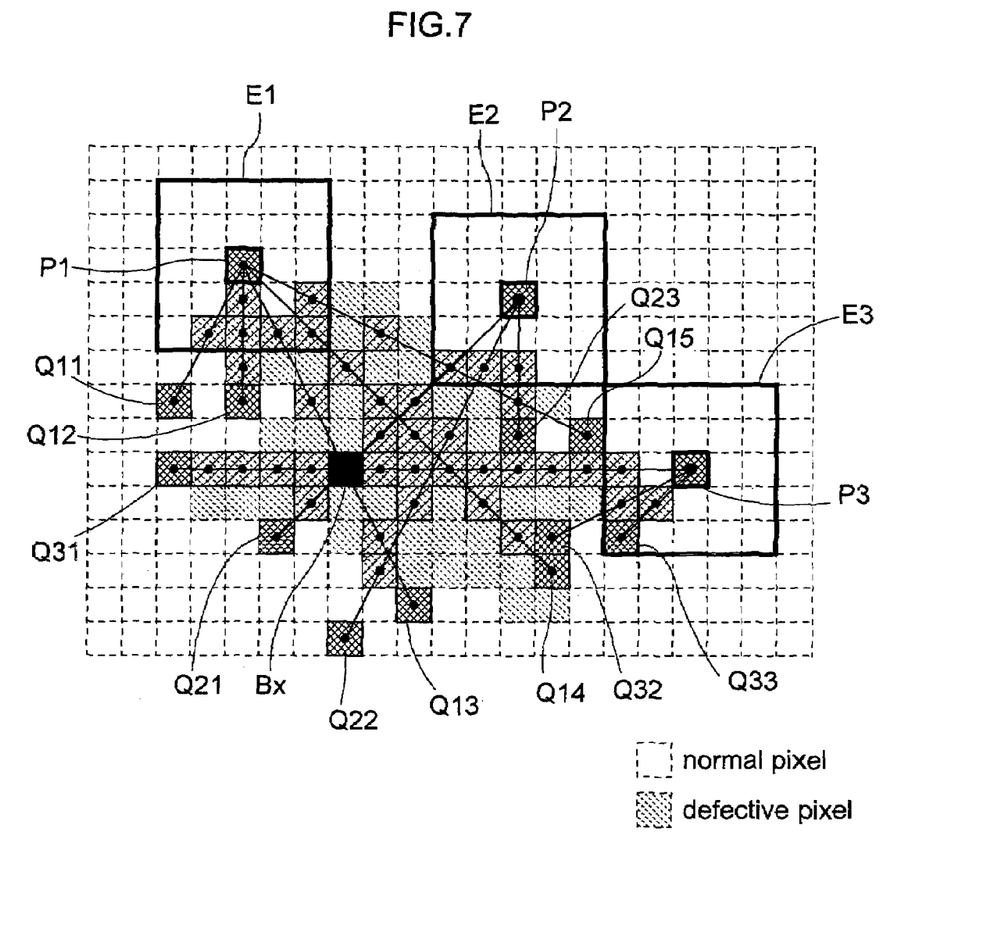
FIG. 7 is an explanatory view illustrating an example of operations at steps #03 through #08 on three first target pixel in the correction operation of a defective pixel according to the invention.

And, if it is determined that the calculations of steps #07 and #08 have not yet been completed for all the normal pixels registered in the normal/defective map (step #09: NO), then, the process returns to step #03 to select a next normal pixel as a first target pixel P (step #03) and execute the operations of steps #04 through #08 on this new first target pixel P1. FIG. 7 is an explanatory view of the operations of steps #03 through #08 on other normal pixels as the first target pixels P2, P3, in addition to the same operations of steps #03 through #08 which have been executed on the first target pixel P1. In practice, the selection of the first target pixel P is effected preferably by shifting the pixel one by one to the next one. In this illustration, however, the first target pixels P2; P3 are selected at separate positions, for the sake of convenience of explanation.

And, for the first target pixel P2 and the first target pixel P3, the operations of steps #04 through #08 are effected, like for the fist target pixel P1. In this, in the case of the first target pixel P2, three defective pixels are present within its predetermined area E2. Hence, the normal pixels present on the extension lines extending from the first target pixel P2 to and through these respective defective pixels are set as second target pixels Q21-Q23. Then, the interpolation value H is calculated for the respective defective pixels present between the first target pixel P2 and the respective second target pixels Q21-Q23. And, the weight coefficients W21-W23 are calculated for the respective pairs of the first target pixel P2 and the respective second target pixels Q21-Q23, and these calculation results are stored at the calculation result storing section, 30. Further, in the case of the first target pixel P3, three defective pixels are present in the predetermined area E3. Hence, the normal pixels present on the extension lines extending from the first target pixel P3 to and through these respective defective pixels are set as second target pixels Q31-Q33. Then, the interpolation value H is calculated for the respective defective pixels present between the first target pixel P3 and the respective second target pixels Q31-Q33. And, the weight coefficients W31-W33 are calculated for the respective pairs of the first target pixel P3 and the respective second target pixels Q31-Q33, and these calculation results are stored at the calculation result storing section 30. In this way, by effecting the operations of steps #04 through #08 for the plurality of first target pixels P1-P3, a plurality of interpolation values H are calculated for each single defective pixel. The operations of step #03 through #08 are repeated until the above calculations are completed for all the normal pixels registered as normal pixels in the normal/defective map. With this, in case the predetermined area E consists of 5×5 pixels as in this embodiment, total 8 (eight) interpolation values H are calculated for each one of all the defective pixels registered in the normal/defective map and these calculated values are stored in the calculation result storing section 30. And, the weight coefficients W calculated by the operations of steps #03 through #08 for all of the pairs of the first target pixels P and the second target pixels Q are stored in the calculation result storing section 30 as well.

When the process completes the calculations of the operations at steps #03 though #08 for all the normal pixels registered in the normal/defective map (step #09: YES), then, the weighted average value calculating section 31 calculates a weighted average value A of the interpolation values H of each defective pixel by using the plurality of interpolation values H for each defective pixel stored in the calculation result storing section 30 and the weight coefficients W also stored in the calculation result storing section 30 for the respective pairs of the first target pixels P and the second target pixels Q (step #10). Specifically, in order to calculate this weighted average value A, for each defective pixel, each interpolation value H for each defective pixel is multiplied by the weight coefficient W for the pair of first target pixel P and the second target pixel Q used in the calculation of that interpolation value H. This multiplication operation is effected for all of the plurality of interpolation values H of this defective pixel. Then, the product values of this multiplications are added up and the resultant sum value is then divided by the sum of all of the weight coefficients W employed in said multiplications. In this embodiment, as described above, total of 8 (eight) interpolation values H were calculated for each defective pixel and also total of 8 (eight) weight coefficients W were calculated for the pairs of the first target pixels P and the second target pixels Q corresponding thereto. Therefore, the weighted average value A is calculated by dividing the sum of products of the eight pairs of interpolation values H and weight coefficients W by the sum of the eight weight coefficients W.

The method of calculating a weighted average value Q for a single defective pixel Bx in FIG. 7 will be described next as one specific example of this calculation method of a weighted average value A. Actually, in the case of the present embodiment wherein the predetermined area E consists of 5×5 pixels, total of 8 (eight) interpolation values H are to be calculated. In the following discussion, however, for the sake of convenience of explanation, a method of calculating a weighted average value Ax for three interpolation values H1x, H2x, H3x calculated respectively for the three first target pixels P1, P2, P3 shown in FIG. 7 will be described.

In this case, the weighted average value Ax is calculated specifically in accordance with a following formula (11).

$$Ax = (H1x \times W13 + H2x \times W21 + H3x \times W31)/(W13 + W21 + W31) \quad (11)$$

where, the defective pixel Bx, as shown in FIG. 7, is the pixel located at the point of intersection of the straight line connecting between the first target pixel P1 and the second target pixel Q13, the straight line connecting between the first target pixel P2 and the second target pixel Q21 and the straight line connecting between the first target pixel P3 and the second target pixel Q31. And, the pair of the first target pixel P and the second target pixel Q corresponding to the interpolation value H1x (i.e. used in the calculation of the interpolation value H1x) is P1-Q13, and its weight coefficient is W13. Similarly, the pair corresponding to the interpolation value H2x is P2-Q21 and its weight coefficient is W21, and the pair corresponding to the interpolation value H3x is P3-Q31 and its weight coefficient is W31. Therefore, the weighted average coefficient Ax of the interpolation values H1x through H3x for the defective pixel Bx is as indicated by the formula (11) above. In this way, the weighted average values A of the interpolation values H will be calculated for all the normal defective pixels.

The correcting section 32 corrects the pixel value of each defective pixel by using the weighted average value A calculated for this defective pixel by the operation at step #10 as the final correction value for this defective pixel. Specifically, this correction is done by replacing the pixel value of each defective pixel by the weighted average value A calculated for this defective pixel. Incidentally, though not described in particular above, the calculations at the operations of steps #07, #08, #10, #11 using the pixel values of the normal or defective pixels included in the visible image data are effected for ach color component of R, G, B of the visible image data.

In the foregoing embodiment, the present invention is applied to the image printing system 4 configured for reading an image from a photographic film 2 and then recording this on a print paper 3. The application of the present invention is not limited thereto. Rather, this invention can be applied to any other type of image processing apparatus configured for correcting a defective portion in image data and then outputting the corrected data. Also, the foregoing embodiment deals with color image data including the color components of R, G, B as the visible image data. The invention may be applied also to color image data including other color components or monochrome image data as the visible image data.

The present invention may be embodied in any other manner than described above. Various modifications thereof will be apparent for those skilled in the art without departing from the essential concept thereof defined in the appended claims.

The invention claimed is:

1. An image processing apparatus for correcting a defective portion in image data having a plurality of pixels, the apparatus comprising:

a first target pixel selecting section for selecting a plurality of first target pixels one after another from normal pixels;

a second target pixel detecting section for detecting, for each first target pixel selected by said first target pixel selecting section, a defective pixel present within a predetermined area extending around said first target pixel as its center and then detecting a normal pixel present on an extension line connecting said first target pixel to said defective pixel and setting this detected normal pixel as a second target pixel;

an interpolation value calculating section for calculating for one or more defective pixels present between said first target pixel and said second target pixel, an interpolation value for each said defective pixel based on a pixel value of said first target pixel and a pixel value of said second target pixel;

a weight coefficient calculating section for calculating a weight coefficient for each pair of said first target pixel and said second target pixel, based on the pixel value of the first target pixel and the pixel value of the second target pixel, wherein said weight coefficient is greater for said first and second target pixel when the pixel values of said first and second target pixels are closer to each other;

a memory for storing a plurality of interpolation values calculated for each defective pixel by said interpolation value calculating section and the weight coefficient calculated for each pair of the first target pixel and the second target pixel by said weight coefficient calculating section as said first target pixel selecting section selects the plurality of first target pixels;

a weighted average value calculating section for calculating a weighted average value of the interpolation values of each defective pixel by using the plurality of interpolation values stored in said memory for each defective pixel and the weight coefficient also stored in said memory for each pair of the first target pixel and the second target pixel; and a correcting section for correcting each defective pixel by using said weighted average value calculated by said weighted average value calculating section.

2. The image processing apparatus according to claim 1, wherein in said weight coefficient calculating section, either the pixel value of the first target pixel and the pixel value of the second target pixel whichever the greater is used as a denominator and whichever the smaller is used a numerator and a ratio thereof is raised to the nth power (n is a desired natural number) and this is calculated said weight coefficient.

3. The image processing apparatus according to claim 1, wherein in said weight coefficient calculating section, an absolute value of a difference between the pixel value of the first target pixel and the pixel value of the second target pixel is obtained and a complement of this absolute value relative to a predetermined value is obtained and then raised to the nth power (n is a desired natural number) or this complement is divided by said predetermined value and then raised to the nth power (n is a desired natural number), either said nth power of the complement or the nth power of the quotient resulting from said division being calculated as said weight coefficient.

4. The image processing apparatus according to claim 1, wherein said interpolation value calculating section calculates the interpolation value for each defective pixel present between the first target pixel and the second target pixel by means of a linear interpolation of the pixel value of the first target pixel and the pixel value of the second target pixel.

5. An image processing method for correcting a defective portion in image data having a plurality of pixels, the method comprising the steps of:

selecting a plurality of first target pixels one after another from normal pixels;

detecting portion for detecting, for each first target pixel selected, a defective pixel present within a predetermined area extending around said first target pixel as its center and then detecting a normal pixel present on an extension line connecting said first target pixel to said defective pixel and setting this detected normal pixel as a second target pixel;

calculating for one or more defective pixels present between said first target pixel and said second target pixel, an interpolation value for each said defective pixel based on a pixel value of said first target pixel and a pixel value of said second target pixel;

calculating a weight coefficient for each pair of said first target pixel and said second target pixel, based on the pixel value of the first target pixel and the pixel value of the second target pixel, wherein said weight coefficient is greater for said first and second target pixel when the pixel values of said first and second target pixels are closer to each other;

storing a plurality of interpolation values calculated for each defective pixel and the weight coefficient calculated for each pair of the first target pixel and the second target pixel as the plurality of first target pixels are selected one after another;

calculating a weighted average value of the interpolation values of each defective pixel by using the plurality of interpolation values stored for each defective pixel and the weight coefficient also stored for each pair of the first target pixel and the second target pixel; and correcting each defective pixel by using said weighted average value calculated.

6. The image processing method according to claim 5, wherein in said weight coefficient calculating step, either the pixel value of the first target pixel and the pixel value of the second target pixel whichever the greater is used as a denominator and whichever the smaller is used a numerator and a ratio thereof is raised to the nth power (n is a desired natural number) and this is calculated said weight coefficient.

7. The image processing method according to claim 5, wherein in said weight coefficient calculating step, an absolute value of a difference between the pixel value of the first target pixel and the pixel value of the second target pixel is obtained and a complement of this absolute value relative to a predetermined value is obtained and then raised to the nth power (n is a desired natural number) or this complement is divided by said predetermined value and then raised to the nth power (n is a desired natural number), either said nth power of the complement or the nth power of the quotient resulting from said division being calculated as said weight coefficient.

8. The image processing method according to claim 5, wherein said interpolation value calculating step calculates the interpolation value for each defective pixel present between the first target pixel and the second target pixel by means of a linear interpolation of the pixel value of the first target pixel and the pixel value of the second target pixel.

9. A computer-readable medium comprising computer-executable code for correcting a defective portion in image data having a plurality of pixels, the code comprising instructions for:

selecting a plurality of first target pixels one after another from normal pixels;

detecting portion for detecting, for:each first target pixel selected, a defective pixel present within a predetermined area extending around said first target pixel as its center and then detecting a normal pixel present on an extension line connecting said first target pixel to said defective pixel and setting this detected normal pixel as a second target pixel;

calculating for one or more defective pixels present between said first target pixel and said second target pixel, an interpolation value for each said defective pixel based on a pixel value of said first target pixel and a pixel value of said second target pixel;

calculating a weight coefficient for each pair of said first target pixel and said second target pixel, based on the pixel value of the first target pixel and the pixel value of the second target pixel, wherein said weight coefficient is greater for said first and second target pixel when the pixel values of said first and second target pixels are closer to each other;

storing a plurality of interpolation values calculated for each defective pixel and the weight coefficient calculated for each pair of the first target pixel and the second target pixel as the plurality of first target pixels are selected one after another;

calculating a weighted average value of the interpolation values of each defective pixel by using the plurality of interpolation values stored for each defective pixel and the weight coefficient also stored for each pair of the first target pixel and the second target pixel; and correcting each defective pixel by using said weighted average value calculated.

\* \* \* \* \*